US008516002B2

(12) United States Patent
Rao et al.

(10) Patent No.: US 8,516,002 B2
(45) Date of Patent: Aug. 20, 2013

(54) DEFLATE FILE DATA OPTIMIZATION (75) Inventors: Goutham Rao, San Jose, CA (US); Eric Brueggemann, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 1016 days.

(21) Appl. No.: 12/053,251

(22) Filed: Mar. 21, 2008

(65) Prior Publication Data

US 2009/0240718 A1    Sep. 24, 2009

(51) Int. Cl.
*G06F 17/30*    (2006.01)
(52) U.S. Cl.
USPC ............ 707/796; 707/603; 707/E17.001; 707/693; 707/708
(58) Field of Classification Search
None
See application file for complete search history.

(56) References Cited

U.S. PATENT DOCUMENTS

| 6,728,785 | B1 * | 4/2004 | Jungck | 709/247 |
| 7,844,740 | B2 * | 11/2010 | Jungck | 709/247 |
| 2008/0098160 | A1 * | 4/2008 | Slyz et al. | 711/103 |
| 2008/0307349 | A1 * | 12/2008 | Wang et al. | 715/778 |
| 2009/0037448 | A1 * | 2/2009 | Thomas | 707/101 |

OTHER PUBLICATIONS

Deutsch, P., et al., "RFC1951—DEFLATE Compressed Data Format Specification Version," Network Working Group, Request for Comments: 1951, Aladdin Enterprises, May 1996, located at http://www.faqs.org/rfcs/rfc1951.html, 13 pages.

* cited by examiner

*Primary Examiner* — Shyue Jiunn Hwa
(74) *Attorney, Agent, or Firm* — Kwan & Olynick LLP (57) ABSTRACT

Mechanisms are provided for optimizing file data compressed using deflate mechanisms such as the ZLIB Compressed Data Format Specification and the DEFLATE Compressed Data Format Specification. Deflate mechanisms output different deflate file data depending on specific file data parameters. An optimization tool decompresses the deflate file data and outputs an optimized data stream. When a client application attempts to access the deflate data, the tool deoptimizes the optimized data stream and applies the same deflate algorithm to generate deflate file data. Although the deflate algorithm is applied without using the file data parameters used to generate the original deflate file data, substitute deflate file data is produced.

17 Claims, 7 Drawing Sheets

DEFLATE FILE DATA OPTIMIZATION

DESCRIPTION OF RELATED ART

The present disclosure relates to file optimization. In some examples, the techniques of the present disclosure provide mechanisms for allowing deflate file data optimization.

Network attached storage (NAS) provides application servers the ability to store and access files on file servers over a network. Like direct attached storage and unlike block based storage area networks (SANs), NAS is a file based system that offloads file management operations from application servers to file servers. The file servers themselves may include hard drives, redundant arrays of independent disks (RAIDs), and may be connected to tape drives and tape emulators. File servers are connected to application servers using protocols such as Network File System (NFS), Server Message Block (SMB), etc.

NAS provides a robust mechanism for storing and managing large amounts of data. However, maintaining vast amounts of data is expensive not just in terms of the physical hardware costs, but also in terms of system administration and infrastructure costs. Some mechanisms such as the ZLIB Compressed Data Format Specification and the DEFLATE Compressed Data Format Specification allow lossless storage of compressed data on storage devices. However, the ability to manipulate data compressed using these mechanisms is limited. In some instances, an original compressed stream can not be provided once the deflate data is decompressed.

Consequently, the techniques and mechanisms of the present invention provide improved mechanisms for efficiently optimizing files.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of deflate compression algorithm such as the ZLIB Compressed Data Format Specification and the DEFLATE Compressed Data Format Specification. However, it should be noted that the techniques and mechanisms of the present invention can be used with a variety of alternatives to the deflate compression algorithm. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for optimizing file data compressed using deflate mechanisms such as the ZLIB Compressed Data Format Specification and the DEFLATE Compressed Data Format Specification. Deflate mechanisms output different deflate file data depending on specific file data parameters. An optimization tool decompresses the deflate file data and outputs an optimized data stream. When a client application attempts to access the deflate data, the tool deoptimizes the optimized data stream and applies the same deflate algorithm to generate deflate file data. Although the deflate algorithm is applied without using the file data parameters used to generate the original deflate file data, substitute deflate file data is produced.

Description Of Example Embodiments

In a network attached storage (NAS) system, application servers are connected to file servers over a network. The file servers provide application servers with access to storage through a network file system. The storage provided by the file servers can generally be classified into online and offline storage. Online storage includes direct attached storage (DAS) and storage area networks (SANs) that provide relatively fast read and write access mechanisms. Offline storage includes tape devices and virtual tape devices that tend to have more methodical read and write access mechanisms. In some instances, read and write access to offline storage must occur in block based sequential order.

File servers provide both online storage and offline storage. Users associated with application servers can make file level calls to access data associated with file servers. In many instances, the amount of data managed by file servers is substantial, and costs associated with storing and accessing the data is significant. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient.

In many instances, mechanisms such as the ZLIB Compressed Data Format Specification and the DEFLATE Compressed Data Format Specification are used by application servers to compress data for storage on storage devices. Compression mechanisms using file data, parameters associated with the file, and mechanisms such as the ZLIB Compressed Data Format Specification and the DEFLATE Compressed Data Format Specification are referred to herein as deflate mechanisms. A deflate algorithm takes file data and parameters such as window size, custom dictionaries, and memory level and provides a parameter specific stream.

However, the techniques and mechanisms of the present invention recognize that a deflate stream may not be optimal. According to various embodiments, it is recognized that particular algorithms can be applied to further optimize a data stream. However, to optimize the data, deflate file data first has to be decompressed. A mechanism for increasing the efficiency or reducing the resource usage of a deflated file is referred to herein as file optimization. In some instances, improved compression ratios can be obtained. Consequently, the techniques of the present invention contemplate decompressing or reflating stored data and optimizing the data using optimization algorithms.

However, an application server may not be able to read the optimized data and may be expected deflate data. To allow compatibility with application servers, the optimized data stream is deoptimized and deflated again before passing the data back to the application server.

It is recognized, however, that the parameters required for generating the original compressed or deflate stream are not necessarily available or accessible by an optimization tool. Consequently, the techniques and mechanisms contemplate generating a substitute compressed data stream. According to various embodiments, the substitute compressed data stream does not match the original compressed data stream exactly, but is at least compatible. In one example, the deflate data file has the same length as the original deflate data file. Providing a deflate data file having the same length may be important for a number of applications.

Figure 1:
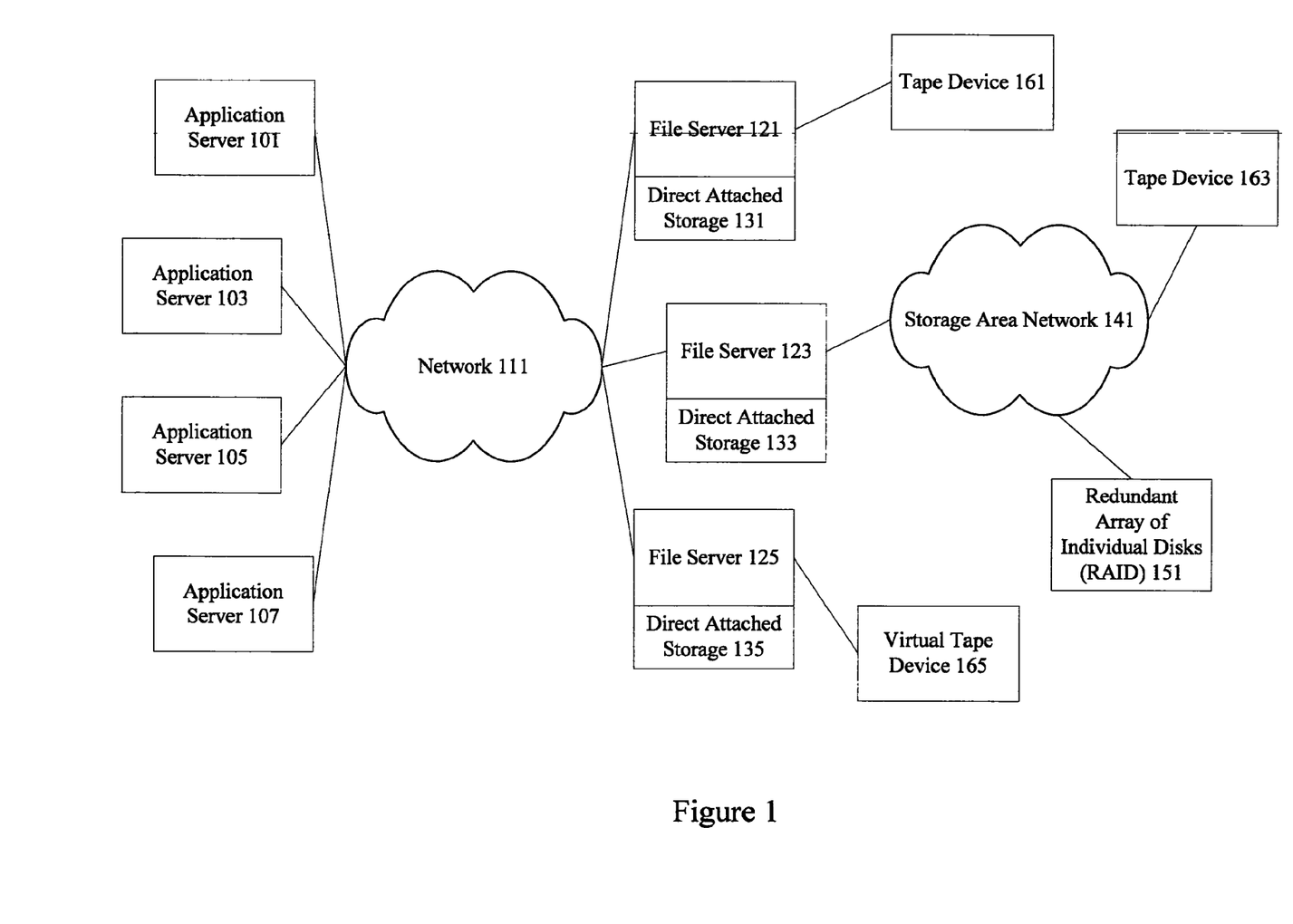
FIG. 1 illustrates a particular example of a network that can use the techniques and mechanisms of the present invention.

FIG. 1 illustrates a particular example of a network that can use the techniques and mechanisms of the present invention. Applications servers 101, 103, 105, and 107 are connected to file servers 121, 123, and 125 through a network 111. A network 111 may be a single network or a combination of different networks. According to various embodiments, each application server 101, 103, 105, and 107 runs applications that require data storage. The file servers 121, 123, and 125 provide data storage through active storage mechanisms such as disk arrays. One example of active storage is a Redundant Array of Individual Disks (RAID) 151 connected to file server 123 through storage area network (SAN) 141. The file servers 121, 123, and 125 also provide data storage through passive storage mechanisms such as tape devices 161 and 163, and virtual tape device 165.

According to various embodiments, applications servers 101, 103, 105, and 107 are connected to file servers 121, 123, and 125 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow application servers 101, 103, 105, and 107 to access data at the file level. The file servers 121, 123, and 125 then use block level protocols such as serial advanced technology attachment (SATA), Internet Small Computer Systems Interface (iSCSI), and storage area networks (SANs) to access individual blocks of data.

Block level protocols generally do not provide any file system capabilities to file servers but instead leave file system operations on the application server side. The data accessed by the file servers 121, 123, and 125 may be physically stored on direct attached storage 131, 133, and 135, such as hard drives included in the corresponding file servers. Alternatively, the data may be physically stored on tape devices 161 or 163, or on virtual tape device 165. A virtual tape device 165 may be implemented as an array of disks. The data may also be stored on RAID 151 connected over a SAN 141.

According to various embodiments, a file area metadata service may be implemented at application servers 101, 103, 105, and 107, at network 111, or at file servers 121, 123, and 125 or at a combination of entities. The file area metadata service intercepts client request and responds to the client request with a response expected by the client. For example, if a client associated with application server 101 requests the size of a particular file, the size of the particular file in non optimized form is provided in the response even though the particular file may now have a different size because of compression and/or compaction. In particular examples, the file area metadata service may intercept the request at an application server 101, at a switch in a network 111, or at a file server 121 and respond with the appropriate metadata. The namespace can continue to be maintained by the file system.

Figure 2:
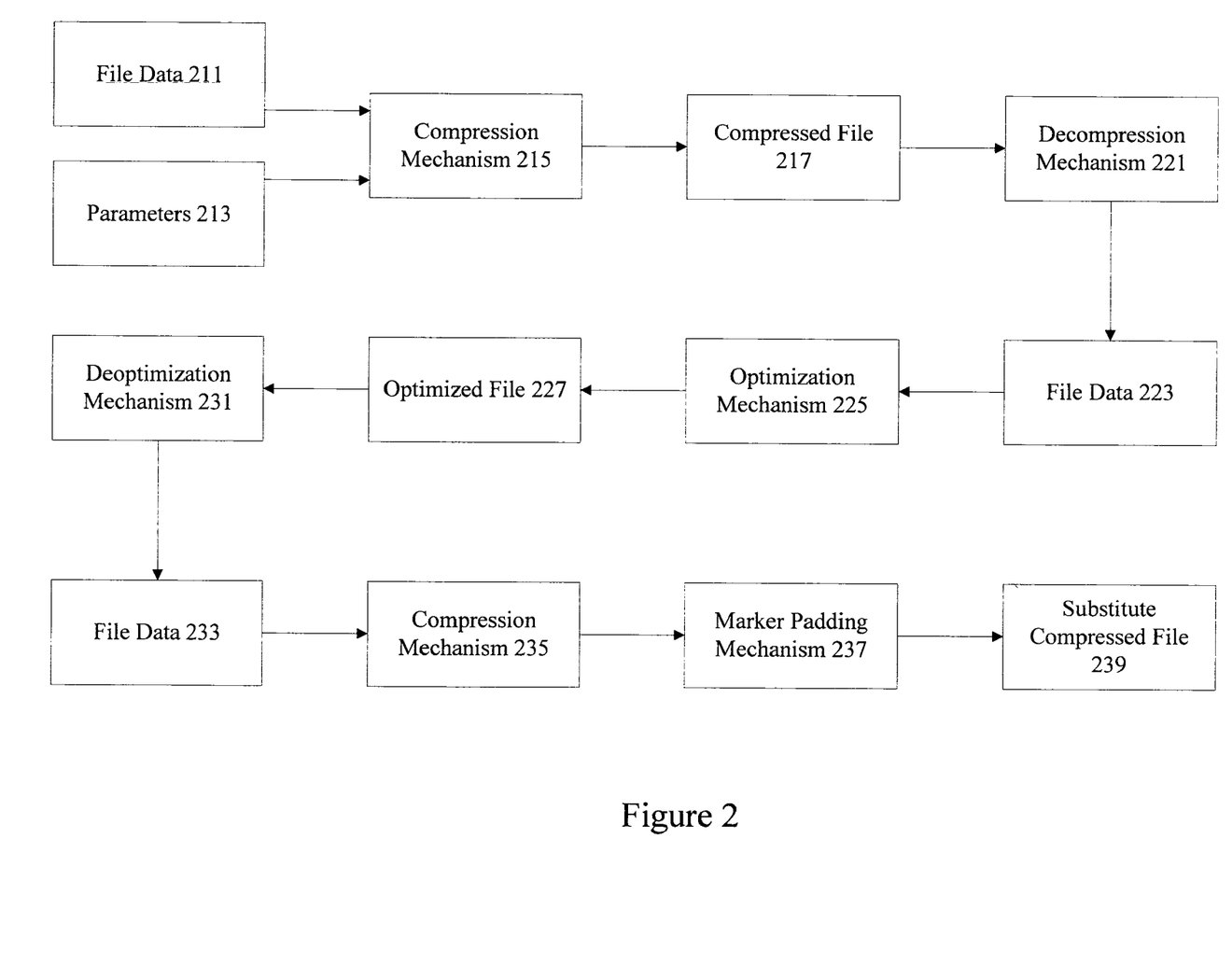
FIG. 2 illustrates a particular example of a compression recompression sequence.

FIG. 2 illustrates a particular example of file recompression. According to various embodiments, file data 211 such as a document of a particular type is passed along with parameters 213 such as window size and custom dictionaries to a compression mechanism 215. In particular embodiments, the compression mechanism 215 is a deflate compression mechanism such as the ZLIB Compressed Data Format Specification and the Deflate Compressed Data Format Specification. The compression mechanism 215 outputs a compressed file 217 that varies based on parameters 213. According to various embodiments, the techniques and mechanisms of the present invention recognize that other algorithms other than deflate related compression schemes can be applied to more efficiently optimize data.

However, these algorithms work on uncompressed data. For example, instead of applying general compression algorithms to all files, algorithms particularly efficient for graphics files may be specifically applied to graphics files. Consequently, the techniques and mechanisms of the present invention contemplate decompressing or reflating the compressed data using a decompression mechanism 221. The file data 223 is now in a form that can be efficiently optimized. The file data 223 is passed to an optimization mechanism 225. The optimization mechanism outputs an optimized file 227. According to various embodiments, the optimized file 227 is more efficiently maintained on a storage device. In particular embodiments, the optimized file 227 is smaller in size than compressed file 217, and can be accessed more efficiently by NAS devices.

According to various embodiments, a variety of entities in a NAS system can operate to optimize the file. In particular embodiments, a hardware, firmware, middleware, or software optimization tool decompresses deflated files and optimizes them for storage on NAS devices. The optimization tool can operate in a manner completely transparent to application servers and clients using the application server. However, because the optimization tool operates in a manner transparent to application servers, the application servers themselves expect the data to be compressed using a conventional deflate mechanism, not an optimization tool optimization mechanism.

Consequently, the optimized file 227 is passed to a deoptimization mechanism 231 to provide file data 233. According to various embodiments, file data 233 exactly corresponds to file data 223. The file data 233 is passed to a compression mechanism 235 such as the compression mechanism 215 originally used. However, since the optimization tool does not have access to the original parameters 213 used during deflate, the compressed file generated using compression mechanism 235 would be different from compressed file 217. Consequently, a marker padding mechanism 237 is provided. In particular embodiments, a deflated file can not simply be compressed with any sequence, but can only be padded with sequences of specified length. In particular embodiments, a flush call is made to align the deflate data with a byte boundary. In one example, the flush call is a Z_SYNCH_FLUSH call. According to various embodiments, a deflated portion can then only be padded with a specific 2 byte sequence, a specific 5 byte sequence, and two specific 6 byte sequences. Although the padding does not provide an original deflate file, the padding does provide in most instances a deflate file 239 matching the original deflate file in length.

Figure 3:
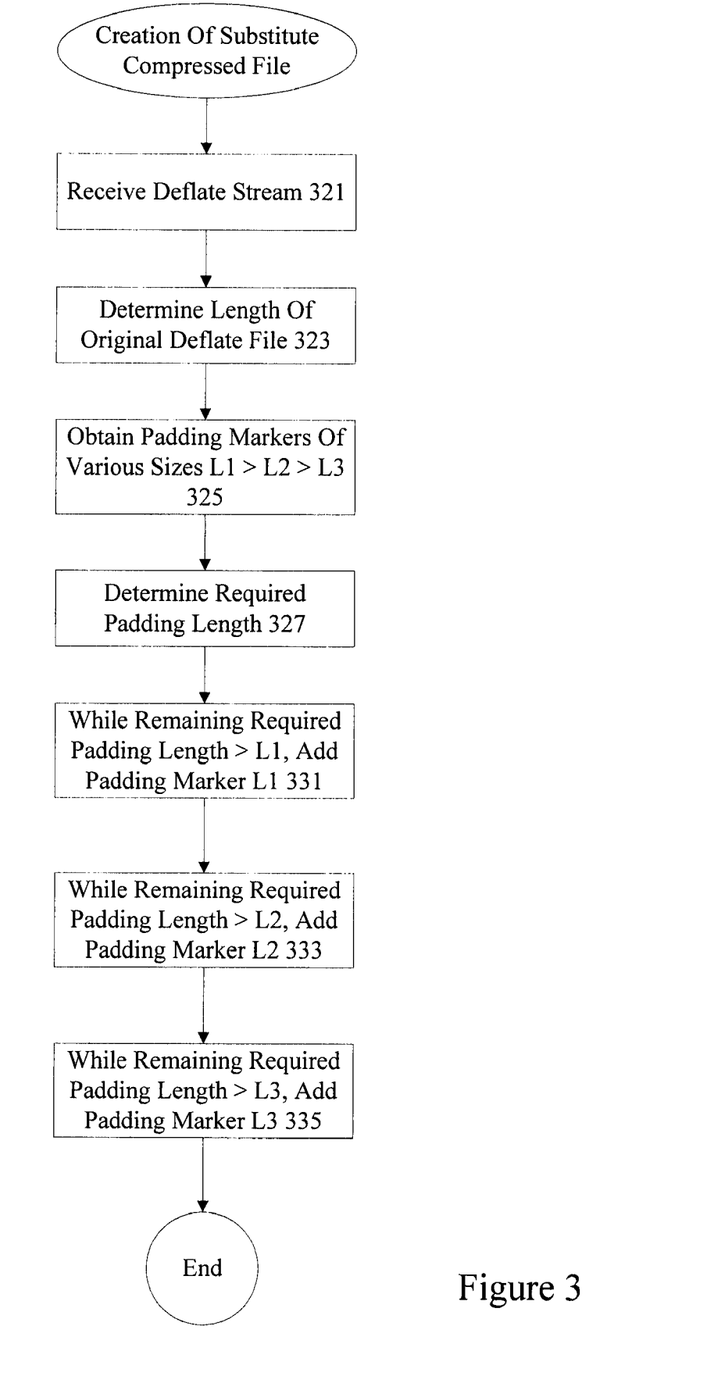
FIG. 3 illustrates a particular example of a technique for performing recompression.

FIG. 3 is a flow process diagram illustrating one example of generation of a substitute compressed file or substitute deflate file. A 321, a deflate stream is received. According to various embodiments, the deflate stream is generated using a mechanism such as the ZLIB compressed file specification or the DEFLATE compressed file specification. The full set of original parameters is not available and/or accessible, so the deflate stream is incomplete. At 323, the length of the original deflate file is determined. In particular embodiments, the original deflate file length is maintained by an optimization tool. In particular embodiments, a mechanism such as Z_SYNCH_FLUSH is called. At 325, padding markers of various sizes L1>L2>L3 are obtained. According to various embodiments, the padding markers are identified in the ZLIB compressed file specification or the DEFLATE compressed file specification and are only available in particular sizes, such as 6 bytes, 5 bytes, and 2 bytes.

At 327, the padding length required is determined. While the remaining required padding length is greater than L1, or greater than 6 bytes, the padding marker L1 is added at 331. While the remaining padding length required is greater than L2, or greater than 5 bytes, padding marker L2 is added. At 335, while the remaining required padding length is greater than L3, or greater than 2 bytes, padding marker L3 is added. This creates a substitute deflate stream that includes padding of L1, L2, and L3 length padding markers.

According to various embodiments, the markers are used by a ZLIB or DEFLATE specification to allow look ahead for an inflate or decompression mechanism. For example, inflate algorithms may require 10-14 bytes of lookahead, so markers are used to provide enough look ahead for inflate. The markers do not alter the actual compressed data. In one example, padding markers include the following sequences:

b1=0x03 0x11—empty static block marked as last block
b2=0x01 0x00 0x00 0xff—empty stored block marked as last block
b3=0x00 0x00 0x00 0xff 0x03 0x00—empty stored, empty static (last)
b4=0x02 0x00 0x00 0x00 0xff 0xff—empty static, empty stored (last)

One particular example of code used to finish a deflate data stream to provide a substitute deflate data file is shown as follows:

```
static inline int ___finish__deflate__stream(
    reflate_t *r)
{
    unsigned char b1[2] = {0x03, 0x00};
    unsigned char b2[5] = {0x00, 0x00, 0x00, 0xff, 0xff};
    unsigned char b4[6] = {0x02, 0x00, 0x00, 0x00, 0xff, 0xff};
    int space, rval = OK;
    int i;
    deflateEnd(&r->dstrm);
    inflateEnd(&r->istrm);
    fflush(r->dst);
    r->srcend = ftell(r->src);
    r->dstend = ftell(r->dst);
    space = ((r->srcend - r->srcstart) - (r->dstend - r->dststart));
```

The length of an original deflate data file length may differ from the length of a deflate data stream generated without using file data parameters. If the original deflate file length differs from the deflate data stream length, it may have to be determined whether available padding markers can be used to generate a substitute deflate data file with the same length. Only markers of particular fixed sizes may be available in a deflate specification. Some markers may only be used at the end of a deflate file. In some instances, a substitute data file with the same length can not be generated. For example, if the original deflate data file length is one byte longer than the deflate data stream, no data block can be added to pad the deflate data stream to the appropriate length. Similarly, if the original deflate data file length is three bytes longer than the deflate data stream, no data block can be added to pad the deflate data stream to the appropriate length. According to various embodiments, a minimum length difference of 29 is required before performing padding using the following mechanism:

```
if (space >= 29){
    // end of stream marker (b1) takes two bytes at the end
    space -= 2;
    // add b4 blocks (6 bytes long)
    while (space % 5){
        i = fwrite(b4, 1, sizeof(b4), r->dst);
        if (i != sizeof(b4)){
            rval = FAIL;
            goto done;
        }
        space -= 6;
        assert(space >= 0);
    }
    // add b2 blocks (5 bytes long)
    while (space) {
        i = fwrite(b2, 1, sizeof(b2), r->dst);
        if (i != sizeof(b2)) {
            rval = FAIL;
            goto done;
        }
        space -= 5;
        assert(space >= 0);
    }
}
else if (space != 0) {
    rval = E_NO_Z_SPACE;
    goto done;
}
```

Other random sequences can not be used because they could adversely impact the integrity of the compressed data. An end of stream marker is added using the following code.

```
    i = fwrite(b1, 1, sizeof(b1), r->dst);
    if (i != sizeof(b1)){
        rval = FAIL;
        goto done;
    }
done:
    fflush(r->dst);
    r->srcend = ftell(r->src);
    return rval;
}
```

After a deflate file is decompressed, an optimization algorithm can be applied to more efficiently compress the data into an optimized file.

Figure 4:
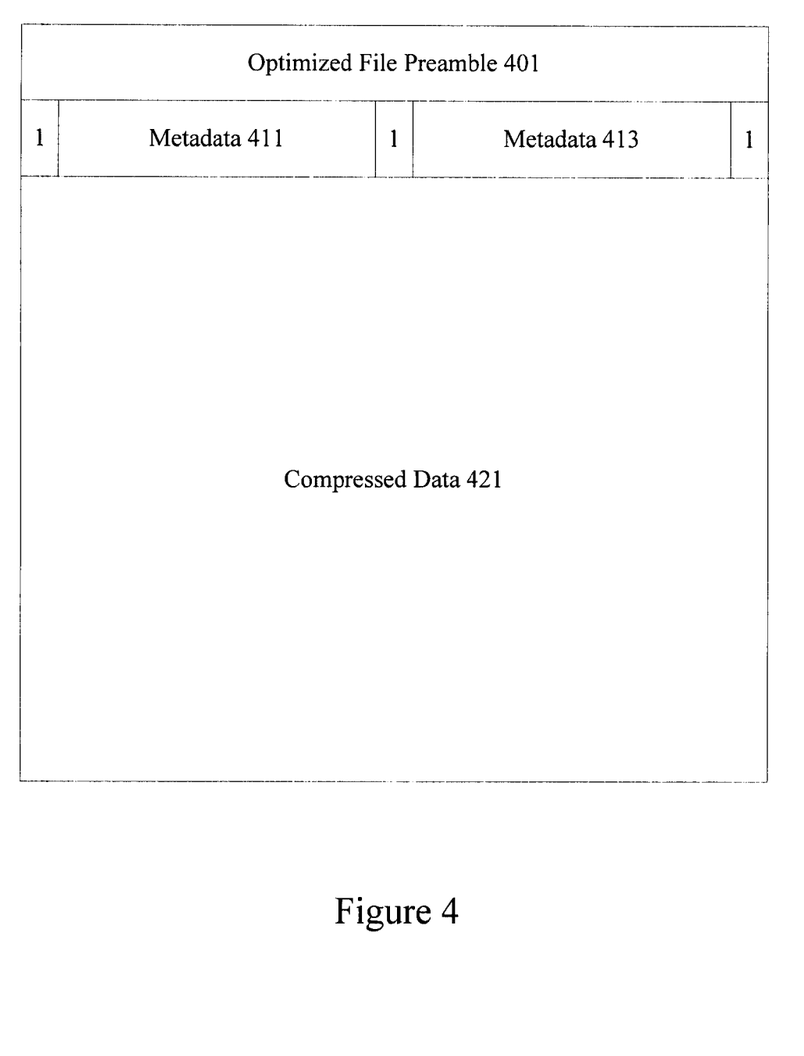
FIG. 4 illustrates a particular example of a compressed file.

FIG. 4 illustrates one example of an optimized file. The optimized file includes an optimized file preamble 401. The optimized file also includes compressed data 421. According to various embodiments, metadata is written twice as metadata 411 and metadata 413. Individual bits surround metadata fields 411 and 413. In particular examples, if the bits surrounding a particular metadata entry have not been written, the metadata entry is not considered to be committed. Using bits surrounding the metadata provides a semblance of an atomic operation. If all bits are written, the metadata 411 and 413 can be considered accurately written. If some surrounding bits are not yet written, the metadata may be considered as not yet committed. According to various embodiments, metadata 411 and metadata 413 is configured to be a block size that can be atomically written by a hard drive.

In particular examples, all operations are designed such that, should a crash occur at any point, there is no loss or corruption of data. However, there can be stale files or database entries left behind. Attempting to eliminate this possibility is a very complex problem which dictates the need for transactional semantics across multiple file system and database operations. Since the situation arises only when a poorly-timed failure occurs, and results only in additional space usage, the entire design is not burdened with excess complexity. According to various embodiments, a periodic garbage collection routine is used to discover and clean up any unnecessary files or database entries.

It should be noted that namespace information continues to be maintained by the file system and need not to be stored in any compressed file.

Figure 5:
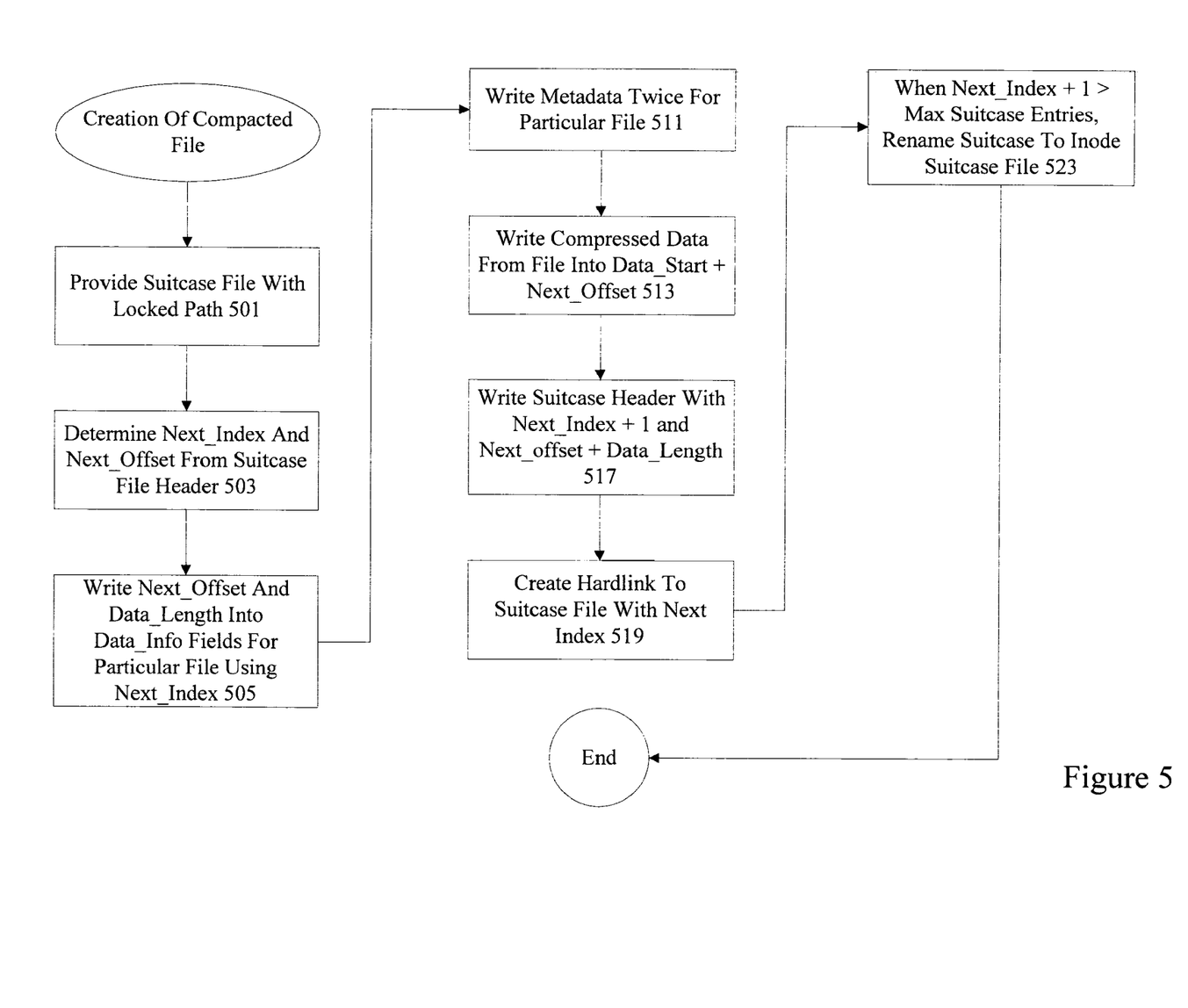
FIG. 5 illustrates a particular example of compacted file creation.

FIG. 5 illustrates one example of compacted file creation. At 501, a suitcase file with a locked path is provided. According to various embodiments, the suitcase file path is locked and the suitcase file itself is opened. If the suitcase file does not exist, a file such as sc.ofs is created. In particular examples, only one active suitcase file is permitted per directory. At 503, the next_index and next_offset are determined from the suitcase file. At 505, the next_offset and data_length fields are written into the data_length and data_info fields for a particular file at the next_index 505 value. At 511, the metadata is written twice for a particular file. At 513, the compressed data from the file is written into the data_start+next_offset position. In some instances, the data from the file may already be compressed or compacted. At 517, a suitcase header is written with next_index+1 and next_offset+data_length.

According to various embodiments, a hard link is created for the suitcase file with filename.<next_index>.ofs at 519. In particular examples, the filename is used to provide uniqueness within the directory. The filename also allows a garbage collector to check that the hard link remains active. A simulated link (symlink) can be associated with an index file name. In this manner, client applications continue to have a consistent view of data files. Symlink files correspond to client application maintained file names. The file name includes an encoded file index for accessing the appropriate metadata and compressed data corresponding to a particular file. In this manner, a client can access metadata and compressed data in a suitcase file while maintaining use of an original file name.

When the next_index+1 reaches a maximum at 523, the suitcase file is renamed to <inode>.sc.ofs. The rename prevents adding new entries into the suitcase file. In particular examples, the inode name guarantees uniqueness within the resource point and, hence, directory. The rename also allows a garbage collector to easily unlink the suitcase once the link count reaches one. The suitcase path can then be unlocked.

Figure 6:
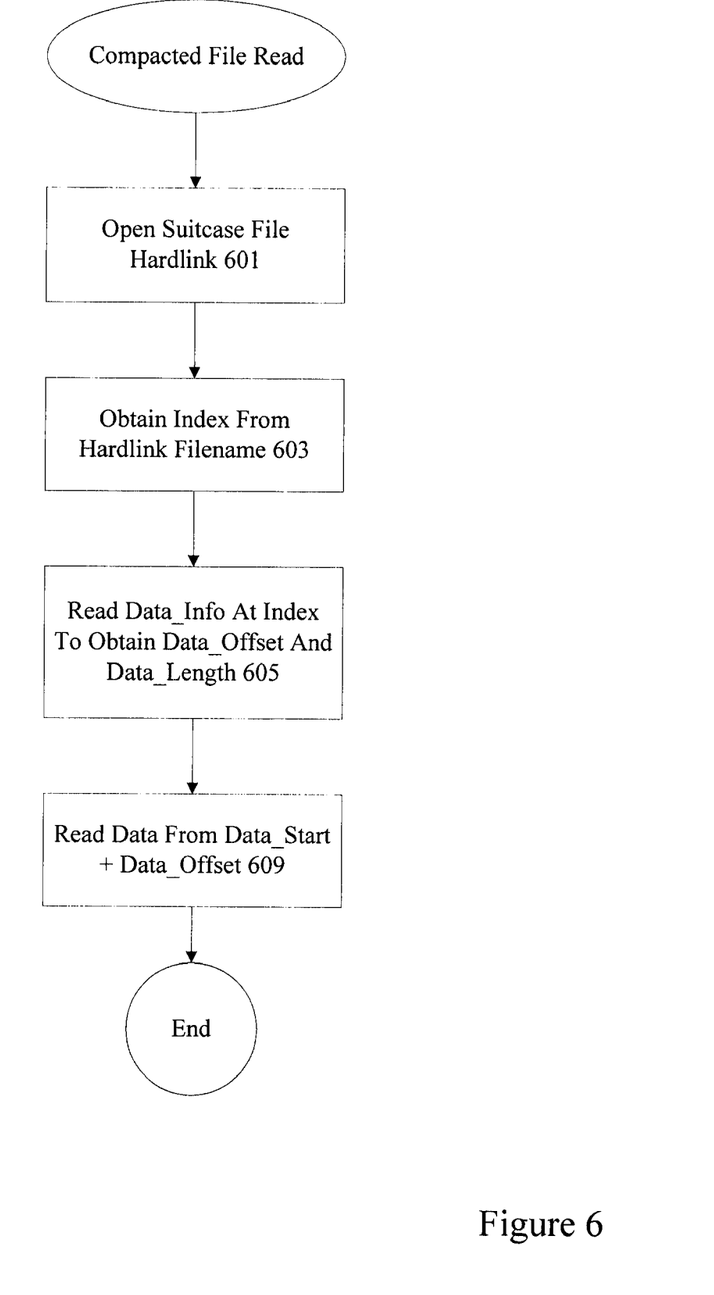
FIG. 6 illustrates a particular example of a compacted file read.

FIG. 6 illustrates one example of a compacted file read. According to various embodiments, a suitcase file hardlink is opened at 601. The suitcase file hardlink may be associated with a symlink that provides a client application with a consistent view of the data files. In particular examples, the index is obtained from the hardlink filename at 603. The data_info is read at the index to obtain data_offset and data_length information at 605. The data is read from data_start+data_offset at 609. In this manner, data can be obtained from a suitcase file while providing a client application with a consistent file name.

According to various embodiments, data can be retrieved using the 64 bit inode number of the file as the lookup key. This number is used since it does not change for the lifetime of the file. It should be noted that for a non-file area metadata service controlled file, a rogue client behaves in the same manner as a file area metadata service supported client. For file area metadata service controlled file, a rogue client will receive permissions errors from the file system, since such a file will be owned a different user such as a file area metadata service associated user.

Figure 7:
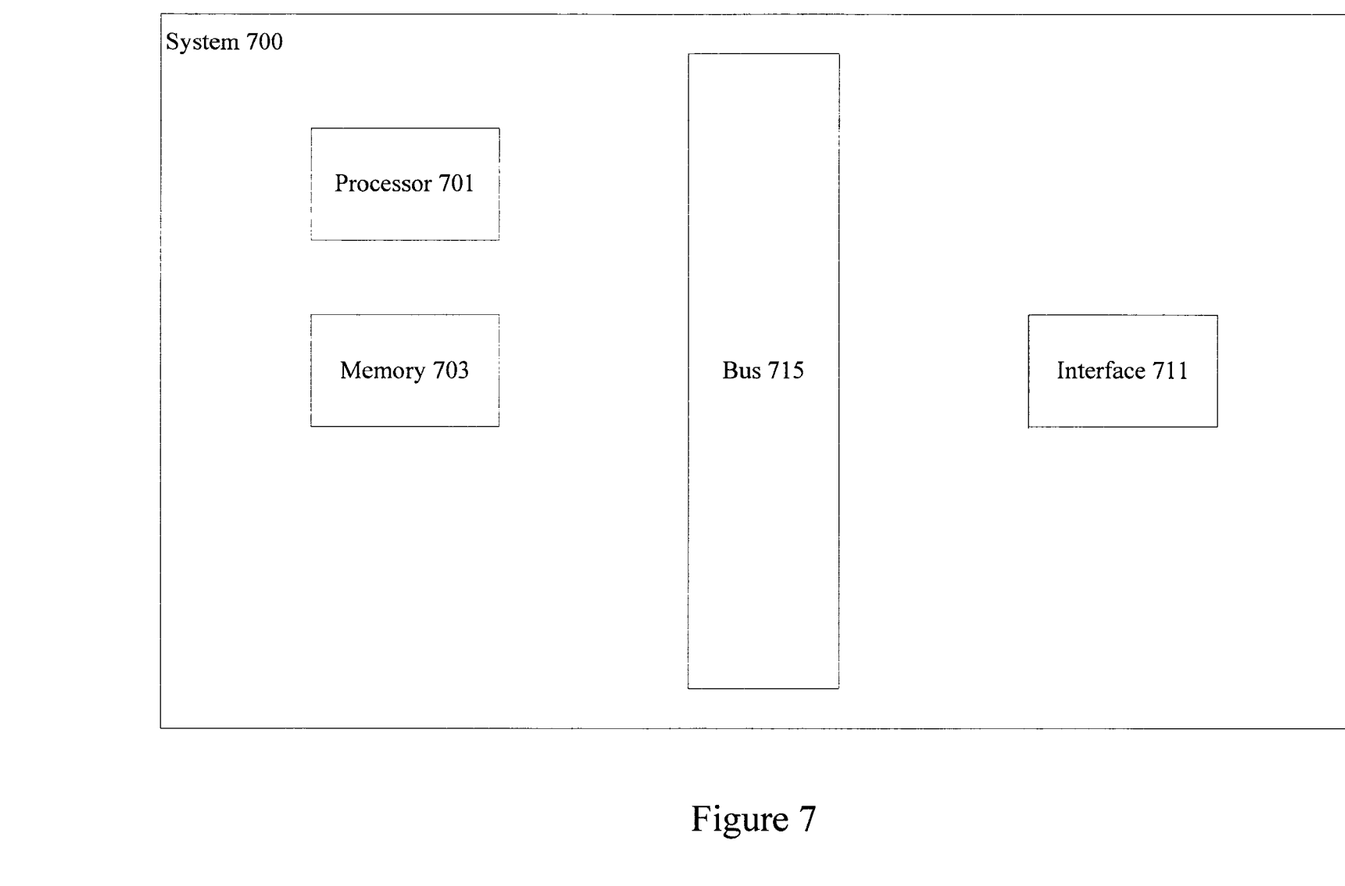
FIG. 7 illustrates a particular example of a computer system.

A variety of devices and applications can implement particular examples of deflate file data optimization. FIG. 7 illustrates one example of a computer system. According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as pattern generation. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
    decompressing deflate file data corresponding to file data compressed using a plurality of file data parameters and a deflate algorithm, wherein the deflate file data is decompressed to obtain the file data;
    optimizing the file data to generate optimized file data, the optimized file data having an optimized file data length less than the deflate file data length;
    receiving a request to access the deflate file data;
    deoptimizing the optimized file data to obtain the file data;
    recompressing the file data using the deflate algorithm without access to the plurality of file data parameters to generate substitute deflate file data, wherein the file data is recompressed using an optimization tool that does not have access to the plurality of file data parameters and the substitute deflate file data does not match the deflate data file exactly but is compatible with the deflate file data, wherein substitute deflate file data is generated by adding a plurality of padding markers provided with a deflate algorithm specification.

2. The method of claim 1, wherein the deflate algorithm generates a deflate file data stream.

3. The method of claim 2, wherein generating substitute deflate file data comprises flushing the deflate file data stream to a byte boundary.

4. The method of claim 1, wherein generating substitute deflate file data comprises adding bytes to the deflate file data stream so that the substitute deflate file data stream length is the same as the deflate file data length.

5. The method of claim 1, wherein the padding markers include empty static and empty stored blocks used for a corresponding inflate algorithm.

6. The method of claim 1, wherein the request is received from an application server connected to a Network Attached Storage (NAS) system.

7. The method of claim 6, wherein the plurality of file data parameters include a window size, a custom dictionary, and a memory level.

8. An apparatus, comprising:
    a processor configured to decompress deflate file data corresponding to file data compressed using a plurality of file data parameters and a deflate algorithm, wherein the deflate file data is decompressed to obtain the file data, the processor further configured to optimize; the file data to generate optimized file data, the optimized file data having an optimized file data length less than the deflate file data length;
    an interface configured to receive request to access the deflate file data;
    memory configured to hold file data after optimized file data is optimized;
    wherein the file data is compressed using the deflate algorithm without access to the plurality of file data parameters to generate substitute deflate file data, wherein the substitute deflate file data does not match the deflate file data exactly but is compatible with the deflate file data, wherein substitute deflate file data is generated by adding a plurality of padding markers provided with a deflate algorithm specification.

9. The apparatus of claim 8, wherein the deflate algorithm generates a deflate file data stream.

10. The apparatus of claim 9, wherein generating substitute deflate file data comprises flushing the deflate file data stream to a byte boundary.

11. The apparatus of claim 8, wherein generating substitute deflate file data comprises adding bytes to the deflate file data stream so that the substitute deflate file data stream length is the same as the deflate file data length.

12. The method of claim 8, wherein the padding markers include empty static and empty stored blocks used for a corresponding inflate algorithm.

13. A non-transitory computer readable medium having computer code embodied therein, the computer readable medium comprising:
    computer code for decompressing deflate file data corresponding to file data compressed using a plurality of file data parameters and a deflate algorithm, wherein the deflate file data is decompressed to obtain the file data;
    computer code for optimizing the file data to generate optimized file data, the optimized file data having an optimized file data length less than the deflate file data length;
    computer code for receiving a request to access the deflate file data;
    computer code for deoptimizing the optimized file data to obtain the file data;
    computer code for compressing the file data using the deflate algorithm without access to the plurality of file data parameters to generate substitute deflate file data, wherein the substitute deflate file data does not match the deflate file data exactly but is compatible with the deflate file data, wherein substitute deflate file data is generated by adding a plurality of padding markers provided with a deflate algorithm specification.

14. The computer readable medium of claim 13, wherein the deflate algorithm generates a deflate file data stream.

15. The computer readable medium of claim 14, wherein generating substitute deflate file data comprises flushing the deflate file data stream to a byte boundary.

16. The computer readable medium of claim 13, wherein generating substitute deflate file data comprises adding bytes to the deflate file data stream so that the substitute deflate file data stream length is the same as the deflate file data length.

17. The computer readable medium of claim 13, wherein the padding markers include empty static and empty stored blocks used for a corresponding inflate algorithm.

* * * * *